United States Patent [19]

Kiyomiya et al.

[11] Patent Number: 4,725,502
[45] Date of Patent: Feb. 16, 1988

[54] INFORMATION RECORDING MEDIUM HAVING AL-TI ALLOY REFLECTIVE LAYER

[75] Inventors: Tadashi Kiyomiya, Saitama; Mitsuo Naito, Chiba; Tatsuya Sasaoka, Kanagawa, all of Japan

[73] Assignee: Sony Corporation, Tokyo, Japan

[21] Appl. No.: 937,992

[22] Filed: Dec. 5, 1986

[30] Foreign Application Priority Data

Dec. 9, 1985 [JP] Japan .................................. 60-276297

[51] Int. Cl.$^4$ ............................................... G11B 7/24
[52] U.S. Cl. ...................................... 428/457; 428/694; 428/900; 430/945; 346/135.1; 369/288
[58] Field of Search ............... 428/694, 900, 65, 928, 428/457; 430/945; 369/13, 288; 365/122; 360/131; 346/135.1, 762

[56] References Cited

U.S. PATENT DOCUMENTS 4,338,000 7/1982 Kamimori et al. ............... 350/357
4,363,844 12/1982 Lewis et al. ....................... 428/163
4,610,903 9/1986 Nomura et al. ..................... 428/64

FOREIGN PATENT DOCUMENTS 161807 11/1985 European Pat. Off. .
208501 12/1982 Japan .
157225 9/1984 Japan .

Primary Examiner—Ellis P. Robinson
Assistant Examiner—William M. Atkinson
Attorney, Agent, or Firm—Hill, Van Santen, Steadman & Simpson

[57] ABSTRACT

An optical information record medium comprising a transparent substrate, an optical information recording layer, and a reflective metal layer. The reflective metal layer is formed of an aluminum-titanium alloy in which the titanium content is between 0.1 and 10 weight %. The medium has improved stability against corrosion due to the improved reflective metal layer.

3 Claims, 4 Drawing Figures

INFORMATION RECORDING MEDIUM HAVING AL-TI ALLOY REFLECTIVE LAYER

BACKGROUND OF THE INVENTION

1. Field of the Invention

The present invention is in the field of optical information recording media which use a laser beam for recording or writing information thereon, and is more particularly concerned with a reflective metal layer used in such optical information recording media.

2. Description of the Prior Art

There are several types of optical information recording media, including the ROM type such as a video disk, a compact disk, or the like, which is capable of only playing back information recorded thereon, the so-called WO type (write-once-disk) type which can record information thereon and from which it can be played back, or a rewritable optical recording disk, a magneto-optical record disk, or the like, capable of reading information or recording the same by using a laser beam. In such optical information record media, a reflective metal layer is formed on the back surface of the recording layer or surface.

For example, in an information record medium of the ROM type shown generally in FIG. 1, there may be provided a video disk of a double-sided type having one major surface consisting of a transparent substrate 1 composed of polycarbonate resin or the like, on which there are formed information pits 2, for example, consisting of concave portions corresponding to recorded information. On the surface of the substrate 1 on which the information pits 2 are formed, there is deposited a reflective metal layer 3 composed of an aluminum film which has been deposited by physical vapor deposition processes such as vacuum evaporation or sputtering. On the reflective metal layer 3 there is coated a protective film 4 composed of an acrylic resin cured, for example, by ultraviolet irradiation. A pair of such substrates 1 each having the information pits 2 as described above are bonded together at their protective films 1 by means of an adhesive agent 5. A laser light is irradiated upon the respective information pits from the back surfaces of the substrates 1 with the reflective pits as shown by an arrow a or b and the presence or absence of the pits 2 is detected, i.e., the information is read by detecting the reflected light from the respective reflection metal layers 3.

However, in an information recording medium of this type having a reflective metal layer made of aluminum, its optical characteristics are sometimes deteriorated, and loss increases upon reading the information. In the WO type or rewritable information record medium, the writing and reading characteristics are occasionally considerably deteriorated. The reason for this is that the reflective metal layer 3 composed of aluminum may become corroded, lowering its reflectivity and it may be recrystallized so as to deteriorate its planar property. For example, although the corrosion-proof properties of aluminum can be improved to a certain degree by using an aluminum having a high purity, its recrystallization cannot be avoided.

SUMMARY OF THE INVENTION

The present invention seeks to provide an improved optical information record medium having an improved reflective metal layer. The record medium of the present invention evidences stabilized optical characteristics resulting from the improved reflective metal layer.

In accordance with the present invention, there is provided an optical information record medium which comprises a transparent substrate, an optical information record medium carried by the substrate, and a reflective metal layer associated therewith, the reflective metal layer being formed of an Al-Ti alloy in which the amount of Ti is between 0.1 and 10 weight %.

Other objects, features and advantages of the present invention will become apparent from the following detailed description of the preferred embodiments, taken in conjunction with the accompanying drawings wherein like reference numerals designate like elements and parts.

DESCRIPTION OF THE PREFERRED EMBODIMENTS

Figure 1:
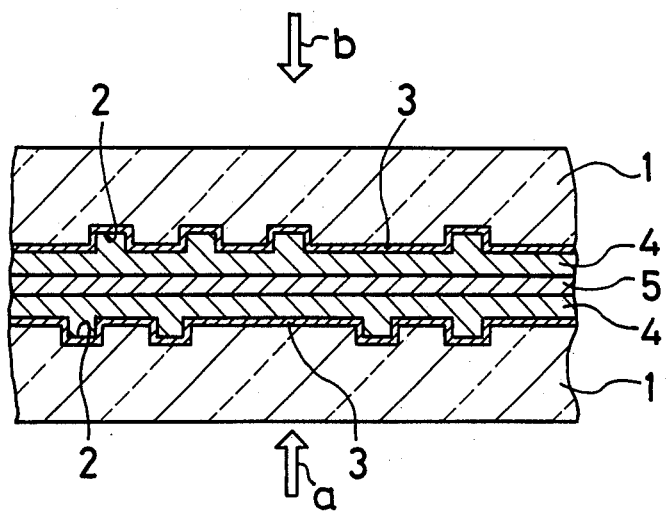
FIG. 1 is a greatly enlarged cross-sectional view of a structure from the prior art to which the present invention is applicable.
Figure 2:
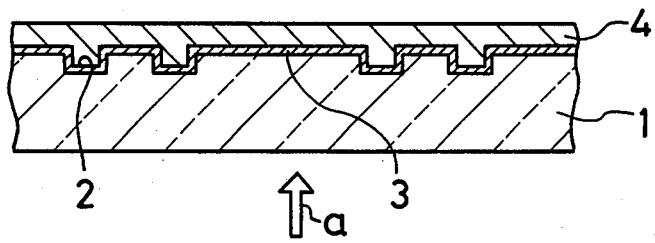
FIGS. 2 to 4, inclusive, represent modified forms of the present invention and illustrate the process for the manufacture of an improved information recording medium according to the present invention.

In accordance with the present invention, there is provided an information record medium including a reflective metal layer 3 as shown in FIG. 2. The reflective metal layer 3 is composed of an aluminum alloy layer containing titanium in an amount of from 0.1 to 10 weight %, preferably 0.3 to 3 weight %. This alloy is deposited by a physical vapor deposition method such as vacuum evaporation, sputtering, or the like.

The information record medium containing the reflective metal layer 3 composed of an Al-Ti alloy has stable and improved characteristics. This is due primarily to the fact that the reflective metal layer 3 composed of the Al alloy containing Ti has excellent corrosion-proof properties and avoids crystal growth. In the reflective metal layer 3, however, if the amount of Ti is less than 0.1 weight %, it is difficult to achieve the above-mentioned effects such as the corrosion-proof property and the avoidance of crystal growth. If the amount of Ti exceeds 10 weight %, segregation of Ti is likely to occur, making it difficult to obtain the proper optical characteristics, that is, a uniformly high reflection property. For this reason, the amount of Ti contained in the reflective metal layer 3 should be in the range from about 0.1 to 10 weight %.

EXAMPLE 1

Figure 3:
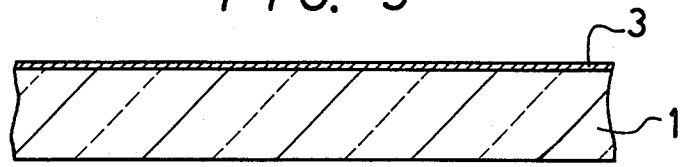

There is illustrated in FIG. 3 a transparent substrate 1 composed of polycarbonate resin, and having deposited thereon a reflective metal layer 3 composed of an Al-Ti alloy with a thickness of 1000 Å. The layer 3 can be applied by a sputtering process using an Al-Ti alloy target. Several samples were made in which the amount of Ti contained in the reflective metal layer 3 was varied from the range of 0.1 to 10 weight %. A comparison sample 1 was made by the above sputtering technique using a pure Al target, without Ti, to obtain a reflective layer composed of Al having a 99.99% purity. Comparison sample 2 was also made by a similar sputtering method to obtain a reflective Al layer containing Ti in an amount of 15 weight %. On the respective samples, a corrosion test was carried out under various testing methods which will be subsequently described. The test results are shown in the following table.

TABLE

| Composition of reflective metal layer | | | Testing Method | | | |
|---|---|---|---|---|---|---|
| | | | I | II | III | IV |
| Al—Ti | 99.99 | weight % | ⊚ | ⊚ | X | △ |
| Al—Ti | 0.05 | weight % | ⊚ | ⊚ | X | △ |
| Al—Ti | 0.1 | weight % | ⊚ | ⊚ | ○ | ○ |
| Al—Ti | 0.3 | weight % | ⊚ | ⊚ | ⊚ | ⊚ |
| Al—Ti | 0.5 | weight % | ⊚ | ⊚ | ⊚ | ⊚ |
| Al—Ti | 1.0 | weight % | ⊚ | ⊚ | ⊚ | ⊚ |
| Al—Ti | 3.0 | weight % | ⊚ | ⊚ | ⊚ | ⊚ |
| Al—Ti | 5.0 | weight % | ○ | ○ | ⊚ | ⊚ |
| Al—Ti | 10.0 | weight % | ○ | ○ | ○ | ○ |
| Al—Ti | 15.0 | weight % | △ | X | X | ○ |

In accordance with testing method I, the reflective metal layer was immersed into a coercive aqueous solution of HCl at a pH of 1 for 30 minutes and then annealed at 70° C. at a relative humidity of 90% for one week. Then, the optical transmissivity of a laser beam having a wavelength of 800 nm relative to the reflective metal layers 3 of the samples was measured. The more the reflective metal layer is corroded, the more its optical transmissivity is increased so that its function as a reflective metal layer is degraded. In the table, an optical transmissivity of less than 5% is indicated by a mark ⊚, an optical transmissivity of less than 20% is indicated by a mark ○, and an optical transmissivity of more than 20% is indicated by a mark X.

EXAMPLE 2

FIG. 2 illustrates a substrate 1 made of polycarbonate resin and having the information pits 2 formed by concave portions thereof. A reflective metal layer 3 was deposited by a method similar to that of Example 1 on top of which there was formed a protective film 4 composed of acrylic resin which could be cured by ultraviolet irradiation. The protective film 4 was coated to a thickness of 10 microns, thus forming an ROM type information record medium. In this case, samples were also made in which the compositions of the reflective metal layer 3 were varied. The foregoing table shows the test results of corrosion of these samples according to the following corrosion testing method referred to as method II. According to this testing method, a scratch having a depth reaching to the reflective metal layer 3 from the protective layer 4 was formed on the respective samples. The samples were then immersed into a dilute hydrochloric acid aqueous solution having a pH of 1 for 30 minutes and kept in an atomosphere of 70° C. at a relative humidity of 90% for one week. The degree of corrosion was then judged by measuring the corroded length on the line of the above described scratch. In the table, a mark ⊚ indicates the case where the corrosion speed was less than 5 mm/week, the mark ○ indicates the case where the corrosion speed was less than 10 mm/week and the mark X indicates the case where the corrosion speed was more than 10 mm/week.

EXAMPLE 3

Figure 4:
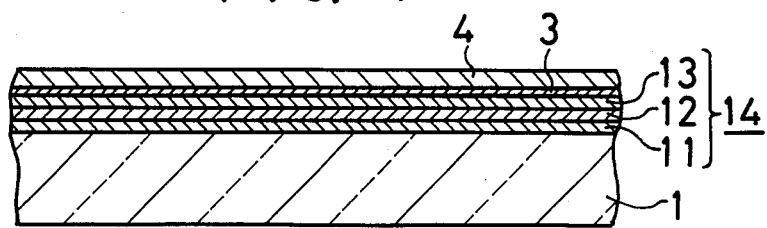

As shown in FIG. 4, there was provided a substrate 1 made of polycarbonate resin, and sequentially deposited thereon were a first layer 11 made of $Sb_2Se_3$, a second layer 12 composed of $Bi_2Te_3$, and a third layer 13 made of $Sb_2Se_3$ by sputtering. The composite layers formed an information recording layer generally indicated at 14. On the information recording layer, there was deposited a reflective metal layer 3 similarly to Example 1, thus forming an information record medium. The medium was used as the WO-type optical disk in which a laser beam was irradiated on the record layer 14 to thereby change the optical reflectivity. The recording of the information was thus carried out by changes of the optical reflectivity as a result of laser irradiation.

Also in this case, samples were made with different compositions for the reflective metal layer 3. The degree of corrosion was tested in accordance with the following testing method III and the results are indicated on the foregoing table.

According to testing method III, the samples were kept at 70° C. and a relative humidity of 90% for 1320 hours and then their corrosion and recrystallization, that is, the occurrence of concavity and convexity, and the degrees thereof, were judged on the basis of the increase of the read bit error rate. In the table, a mark ⊚ indicates the case where the error rate was less than $1 \times 10^{-6}$, a mark ○ indicates the case where it was more than $1 \times 10^{-6}$, and less than $1 \times 10^{-5}$, and a mark X indicates the case where it was more than $1 \times 10^{-5}$.

EXAMPLE 4

Samples were made by a method similar to Example 1 and on these samples, the time required for the sample to evidence a spike noise after being heated at 70° C. was measured. The measured results are indicated on the foregoing table. In the table, a mark ⊚ indicates the case where the spike noise was not yet produced after one year, a mark ○ indicates the case where it was produced after three months, and a mark △ indicates the case where it was produced within one month.

As will be seen from the table, the information record medium of the present invention having an Al-Ti reflective metal layer containing Ti in an amount ranging from 0.1 to 10.0 weight %, preferably from 0.3 to 3.0 weight %, was particularly effective in corrosion resistance and the occurrence of concavity and convexity, i.e., the recrystallization was suppressed. Accordingly, the information record medium of the present invention has a stable characteristic for a long time.

In a modified form of the present invention, that of a magneto-optical recording medium, a magnetic layer can be formed on the substrate and sandwiched by transparent dielectric layers. The optical information record medium thus produced was formed of a magnetic material which changes its direction of magnetization upon irradiation by a laser beam. The reflective metal layer was formed on the surface of the dielectric layer.

Various additional metals can be added to the Al-Ti layer for various purposes. For example, one or more of the following elements can be added in the proportions stated:

Pd from 0.01 to 0.3 weight %;
Mn from 0.1 to 1.0 weight %;
Mg from 0.1 to 1.0 weight %;
Si from 0.1 to 1.0 weight % for each 100 parts by weight of the Al-Ti alloy matrix with excellent results being achieved.

In accordance with the present invention, the use of a reflective metal layer 3 of an Al-Ti alloy layer as described provided an information record medium having stable and improved characteristics. The present invention can be applied to information record media such as various kinds of optical disks, optical magnetic disks, and the like having a reflective film to secure the advantages noted above.

The above description is given on the basis of preferred embodiments of the invention but it will be apparent that many modifications and variations can be effected by one skilled in the art without departing from the spirit or scope of the novel concepts of the invention so that the scope of the invention should be determined by the appended claims only.

We claim as our invention:

1. An optical information record medium comprising:
   a transparent substrate,
   an optical information record layer carried by said substrate, and
   a reflective metal laayer associated with said optical information record layer, said reflective metal layer being composed of an Al-Ti alloy containing from 0.3 to 3.0% by weight Ti.

2. An optical information record medium according to claim 1 in which said optical information record layer is formed of a magnetic material which changes its direction of magnetization upon irradiation by a laser beam.

3. An optical information record medium according to claim 1 wherein said reflective metal layer contains at least one of the following additives per 100 parts by weight of the Al-Ti alloy:
   Pd in 0.01 to 0.3 parts by weight
   Mn is 0.1 to 1.0 parts by weight
   Mg in 0.1 to 1.0 parts by weight, or
   Si in 0.1 to 1.0 parts by weight.

* * * * *